United States Patent [19]
Fukatsu et al.

[11] Patent Number: 4,853,803
[45] Date of Patent: Aug. 1, 1989

[54] MULTI-MODE AND MULTI-CHANNEL REPRODUCING APPARATUS WITH CHANNEL CHANGE COORDINATED WITH MODE CHANGE

[75] Inventors: Tsutomu Fukatsu; Taizou Hori; Toshiyuki Masui, all of Kanagawa; Takashi Kobayashi, Tokyo; Tetsuya Wakui, Chiba; Koji Takahashi, Kanagawa, all of Japan

[73] Assignee: Canon Kabushiki Kaisha, Tokyo, Japan

[21] Appl. No.: 944,578

[22] Filed: Dec. 22, 1986

[30] Foreign Application Priority Data

Dec. 27, 1985 [JP] Japan .............................. 60-292537
Dec. 27, 1985 [JP] Japan .............................. 60-292538
May 6, 1986 [JP] Japan .............................. 61-102128
May 15, 1986 [JP] Japan .............................. 61-109688

[51] Int. Cl.$^4$ ...................... G11B 15/20; G11B 27/22
[52] U.S. Cl. .................................. 360/72.2; 360/73.01
[58] Field of Search ...................... 360/71, 72.1–72.3, 360/73

[56] References Cited

U.S. PATENT DOCUMENTS

4,224,644  9/1980  Lewis et al. ................. 360/72.2
4,228,471 10/1980  Shiga .......................... 360/73
4,551,774 11/1985  Sakaguchi et al. ........... 360/72.1
4,649,442  3/1987  Kunii et al. .................. 360/72.2

FOREIGN PATENT DOCUMENTS

56-3476    1/1981  Japan .......................... 360/71
58-158067  9/1983  Japan .......................... 360/72.2

Primary Examiner—John H. Wolff
Attorney, Agent, or Firm—Robin, Blecker & Daley

[57] ABSTRACT

A multi-channel reproducing apparatus which is capable of reproducing a recorded information signal from each of a plurality of areas of a tape shaped record bearing medium extending in the longitudinal direction of the medium is arranged to reproduce the information signal by repetitively allowing the medium to travel at a high speed while changing the information signal reproducing area from one area over to another.

13 Claims, 13 Drawing Sheets

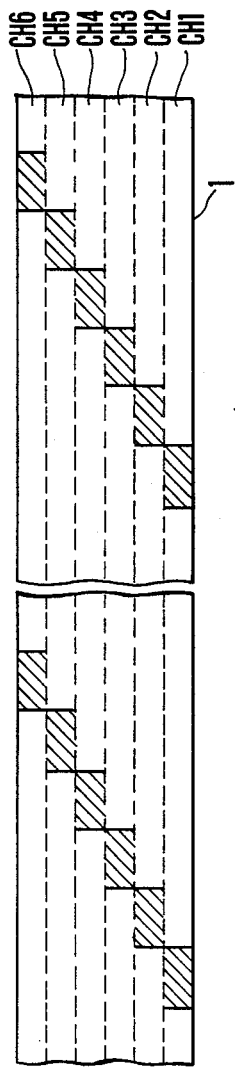
F I G. 8 (A)
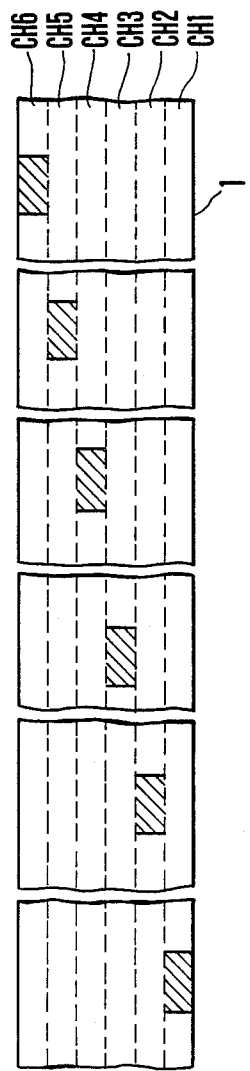
F I G. 8 (B)
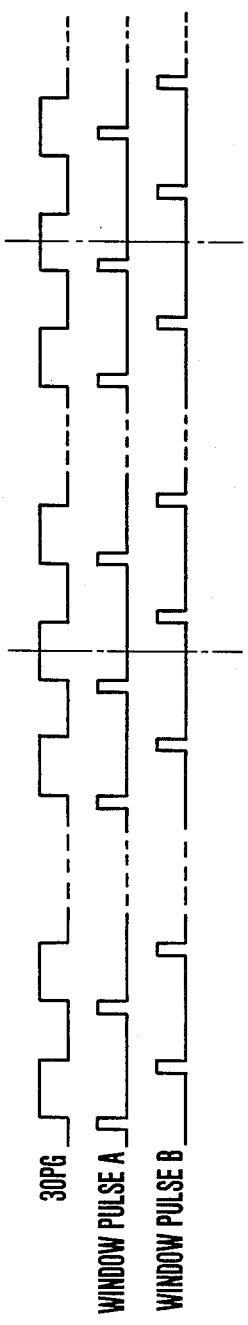
F I G. 9

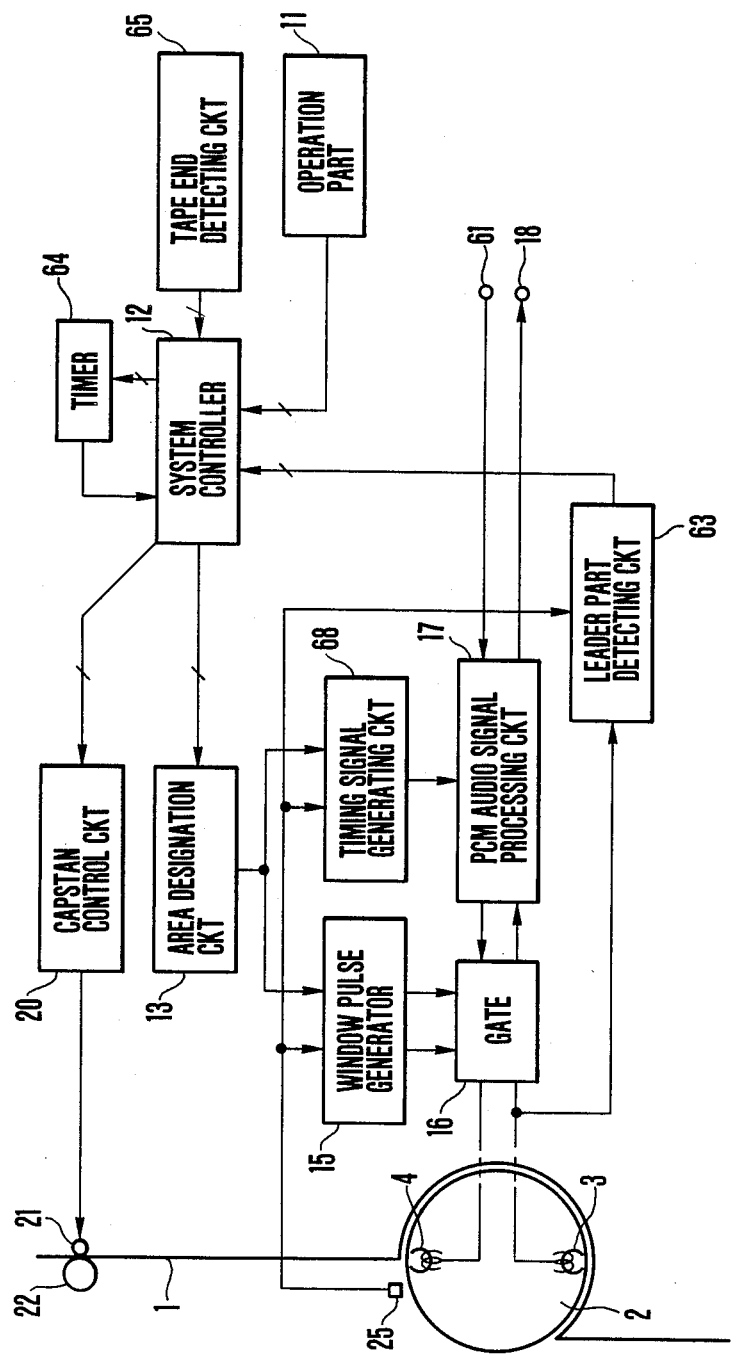
F I G.14

MULTI-MODE AND MULTI-CHANNEL REPRODUCING APPARATUS WITH CHANNEL CHANGE COORDINATED WITH MODE CHANGE

BACKGROUND OF THE INVENTION

1. Field of the Invention

This invention relates to a multi-channel reproducing apparatus and more particularly to an apparatus which is capable of reproducing a recorded information signal from each of a plurality of areas of a tape shaped record bearing medium extending in the longitudinal direction of the medium.

2. Description of the Related Art

In the field of magnetic recording, high density recording has recently come to be pursued. Video tape recorders (hereinafter referred to as VTRs) also have come to be capable of performing high density magnetic recording by lowering the travelling speed of a magnetic tape. The conventional method of recording an audio signal with a fixed head hinders efforts to have a high relative speed between the tape and the head and thus results in a deteriorated quality of reproduced sounds. In one of solutions of this problem, each of recording tracks which is to be formed by a rotary head is extended to be longer than the conventional track length and a time base compressed audio signal is recorded within the extended portions of tracks one after another. The details of this method are as follows:

For example, in the case of a VTR of the rotary 2-head helical scanning type, the magnetic tape which has been arranged to be wrapped at least 180 degrees around a rotary cylinder is changed to be wrapped to a greater $(180+\theta)$ degree around the rotary cylinder. Then, an audio signal which is pulse code modulated (PCM) and time base compressed is recorded within the additional wrapping portion of the tape thus obtained. FIG. 1 of the accompanying drawings shows the magnetic type transport system of a VTR of this type. FIG. 2 shows recording tracks formed on the magnetic tape by the VTR of FIG. 1. The illustrations include the magnetic tape 1; a rotary cylinder 2; heads 3 and 4 which are mounted on the rotary cylinder 2 at a phase difference of 180 degrees between them and are arranged to have different azimuth angles; video signal recording parts 5 of the tracks formed on the magnetic tape 1; and audio signal recording parts 6 of the tracks. The video parts 5 are formed with the heads 3 and 4 when the 180 degree wrapping portion of the tape around the rotary cylinder 2 is traced by these head. The audio parts 6 are obtained when the 8 degree wrapping portion of the tape around the cylinder is traced by these heads 3 and 4. In FIG. 2, reference symbols f1 to f4 denote the frequencies of tracking control pilot signals which are recorded in the recording tracks in a superimposed manner. These frequencies are in a relation of $(f2-f1)=f3-f4 \approx fH$ and $f4-f2 \approx 2fH$, wherein fH represents the horizontal scanning frequency of the video signal.

When the audio signal which is recorded in the audio part (or area) 6 in a state of having been pulse code modulated and time base compressed is reproduced, the sound quality of the reproduced audio signal favorably compares with the sound quality obtainable by an apparatus arranged specially for audio recording and reproduction.

For the VTR of the above-stated kind, there is another known method, wherein: A different audio signal is arranged to be recorded in the video part (or area) 5. FIG. 3 shows by way of example the tape transport system of an audio tape recorder of that method. The illustration includes a magnetic tape 1 and a rotary cylinder 2 which carries rotary heads 3 and 4. The heads 3 and 4 are thus arranged to obliquely trace the surface of the tape 1 to record an audio signal thereon. A time base compressed audio signal is recorded in each of a total of six longitudinally extending areas on the tape 1 every time the heads 3 and 4 revolve 36 degrees. An audio dedicated tape recorder which is capable of recording audio signals in six channels can be obtained by this arrangement. This tape recorder is further briefly described with reference to FIG. 4 below:

FIG. 4 shows recording tracks formed on a tape by the tape recorder. The audio signals are recorded in the areas (or channels) CH1 to CH6 while the head 3 or 4 is tracing the tape 1 from a point A to a point B, from the point B to a point C, from the point C to a point D, from the point D to a point E, from the point E to a point F and from the point F to a point G respectively. The audio signal recording can be accomplished in each of the areas independently of another. The audio signal recording is made in the so-called azimuth overlapping manner.

Further, in FIG. 4, reference symbols f1, f2, f3 and f4 denote frequencies of pilot signals recorded for the purpose of performing the known four-frequency tracking control.

FIG. 5 is a time chart showing the recording and reproducing operations of the tape recorder described above. In FIG. 5, a part (a) shows a phase detection pulse signal (hereinafter referred to as the PG signal) generated in synchronism with the rotation of the rotary cylinder 2. The PG signal is in a simple wave form of 30 Hz repeating a high level (hereinafter referred to as H level) and a low level (hereinafter referred to as L level) every 1/60 sec. A part (b) shows a PG signal of the polarity opposite to that of the PG signal (a). The PG signal (a) remains at an H level while the head 3 is rotating from the point B to the point G. The PG signal (b) remains at an H level while the head 4 is rotating from the point B to the point G. A part (c) of FIG. 5 shows a pulse signal for reading data obtained from the PG signal (a). The pulse signal (c) is provided for sampling the audio signal of a period corresponding to one field portion of a video signal (1/60 sec) for every other field. A part (d) of FIG. 5 shows a signal which is arranged to be at an H level to represent a signal processing period for adding an error correcting redundant code by means of a RAM or the like to one field portion of audio data sampled, for rearranging the sampled audio data and so on. A part (e) shows a signal which is arranged to be at an H level to represent a data recording period and is provided for the purpose of showing a timing for recording on the tape 1 the recording data obtained through the above-stated signal processing operation.

Referring to FIG. 5, the temporal flow of signals is as follows: The data sampled during a period between a point of time t1 and a point of time t3 (during which the head 3 is moving from the point B to the point G) undergoes the signal processing operation during a period between time points t3 and t5 (while the head is moving from the point G to the point A). The data thus processed is recorded during a period between time points t5 and t6 (while the head 3 is moving from the point A to the point B). In other words, the data is recorded then by the head 3 in the area CH1 shown in FIG. 4. Meanwhile, the data which is sampled when the PG signal (b) is at an H level, is also signal processed in the same manner before it is recorded by the head 4 in the same area CH1.

A part (f) of FIG. 5 shows another PG signal which is obtained by phase shifting the above-stated PG signal (a) to a predetermined phasic extent (36 degrees which is for one area, in this case). In cases where an audio signal is to be recorded according to this PG signal (f) and a PG signal which is not shown but is of the polarity opposite to that of the PG signal (f), the operation of the tape recorder is performed in the following manner: The data which is sampled during a period between time points t2 and t4 is signal processed during a period between time points t4 and t6 in accordance with a signal (g) which is as shown at a part (g) of FIG. 5 and is recorded during a period between time points t6 and t7 in accordance with a signal (h) shown at a part (h) of FIG. 5. In other words, the above-stated data is recorded in the area CH2 shown in FIG. 4 by the head 3 while the head 3 is tracing the tape from the point B to the point C. Then, data which is sampled during a period between time points t4 and t7 is likewise recorded in the area CH2 by the head 4.

A reproducing operation on a signal recorded in the area CH2 is as follows:

Data is read out from the tape 1 by means of the head 3 in accordance with the signal (h) of FIG. 5 during a period between the time points t6 and t7 (or t1 and t2). The data thus read out is signal processed in a manner reverse to the signal processing operation performed during recording. The signal processing operation is performed in accordance with a signal (i) shown at a part (i) of FIG. 5 during a period between time points t7 and t8 (or t2 and t3). During this period, error correction, etc. are performed. Then, in accordance with a signal (j) of FIG. 5, the signal processed data is produced as a reproduced audio signal during a period between time points t8 and t9 (or t3 and t6). Meanwhile, reproduction by means of the other head 4 is of course performed in a manner similar to reproduction by the head 3 at a phase difference of 180 degrees. With the two heads 3 and 4 used in this manner, a continuous reproduced audio signal is obtained.

It goes without saying that recording and reproducing operations can be accomplished for other areas CH3 to CH6 in the same manner by phase shifting the PG signal (a) to an extent of n X 36 degrees and by carrying out the operation on the basis of the phase shifted PG signal. Further, the operation can be carried out independently of the travelling direction of the tape.

As well known, in each of recording tracks formed within each of the areas, there are recorded additional data including synchronizing data, address data, CRC (cyclic redundancy check) data, error correcting parity data and ID data in addition to the 1/60 second portion of the audio data. With this tape recorder an approximately 90 minute length of audio signal can be easily recorded in each of the areas, so that sound recording can be made over a period of nine hours on a single piece of tape. As a result, however, it becomes virtually impossible for the operator to know what is recorded in which part of the tape. Conceivable solutions of this problem include a method of providing the so-called leader indexing arrangement for each of the areas. In accordance with this method, however, a look-up operation for a specific index must be repeated before reproduction of the record of a desired program. Such a look-up operation is quite troublesome for the operator. The method necessitates leader indexing for all the area Assuming that the tape is allowed to travel in the same direction for recording in all the area, it might be necessary in detecting the whereabouts of a desired program for reproduction to have the tape travel back and forth a maximum of six times from one end of the tape to the other end. Therefore, an extremely long period of time becomes necessary in searching for a desired program.

SUMMARY OF THE INVENTION

It is a general object of this invention to provide a multi-channel reproducing apparatus which is capable of solving the above-stated problems of the prior art.

It is a more specific object of this invention to provide a multi-channel reproducing apparatus which permits quick look-up for information recorded in all the recording areas of a record bearing medium without necessitating any large scale additional arrangement.

It is another specific object of this invention to provide a multi-channel reproducing apparatus which permits quick look-up for reproduction for any program recorded in any of a plurality of recording areas extending in parallel in the longitudinal direction of a tape shaped record bearing medium.

Under this object, an apparatus embodying an aspect of this invention for reproducing an information signal from each of a plurality of recording areas respectively extending in the longitudinal direction of a tape shaped record bearing medium comprises: area designating means for designating one of the plurality of recording areas; reproducing means for reproducing the information signal from the area designated by the area designating means; moving means for moving the tape shaped record bearing medium in the longitudinal direction thereof; mode control means for automatically setting the apparatus alternately into a first mode in which the information signal is reproduced by the reproducing means and the tape shaped record bearing medium is moved by the moving means at a predetermined speed and a second mode in which the reproducing means does not reproduce the information signal and the moving means moves the tape shaped record bearing medium at a speed faster than the predetermined speed; and changing means for changing the area designated by the area designating means while the mode control means is in operation.

It is a further object of this invention to provide a multi-track reproducing apparatus which is capable of reliably reproducing a specific part of information from every one of recording areas of a tape shaped record bearing medium even when the medium is allowed to travel at a high speed.

Under that object, an apparatus embodying an aspect of this invention for reproducing from a record bearing medium a digital signal including main information data, additional information data and redundant data comprises: head means arranged to trace the surface of the record bearing medium; error correction means for performing an error correcting operation on the digital signal reproduced by the head means by using the redundant data; first regenerating means for regenerating said main information data on the basis of the digital signal error corrected by the error correction means; and second regenerating means for regenerating the additional information on the basis of the digital signal which is not error corrected by the error correction means.

The above and other objects and features of the invention will become apparent from the following detailed description of embodiments thereof taken in connection with the accompanying drawings.

BRIEF DESCRIPTION OF THE DRAWINGS

FIGS. 8(A) and 8(B) are illustrations showing parts from which records are reproduced by the information look-up operation of the tape recorder of FIG. 6.

FIG. 9 is a timing chart showing the generation timing of window pulses generated during the information look-up operation of the tape recorder of FIG. 6.

FIG. 14 is a diagram showing in outline a tape recorder arranged according to this invention as another embodiment thereof.

DETAILED DESCRIPTION OF THE PREFERRED EMBODIMENTS

Figure 3:
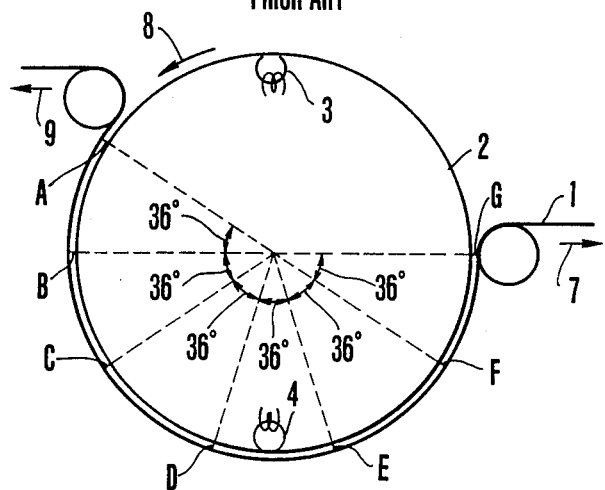
FIG. 3 is an illustration of the tape transport system of the conventional multi-channel audio tape recorder.
Figure 6:
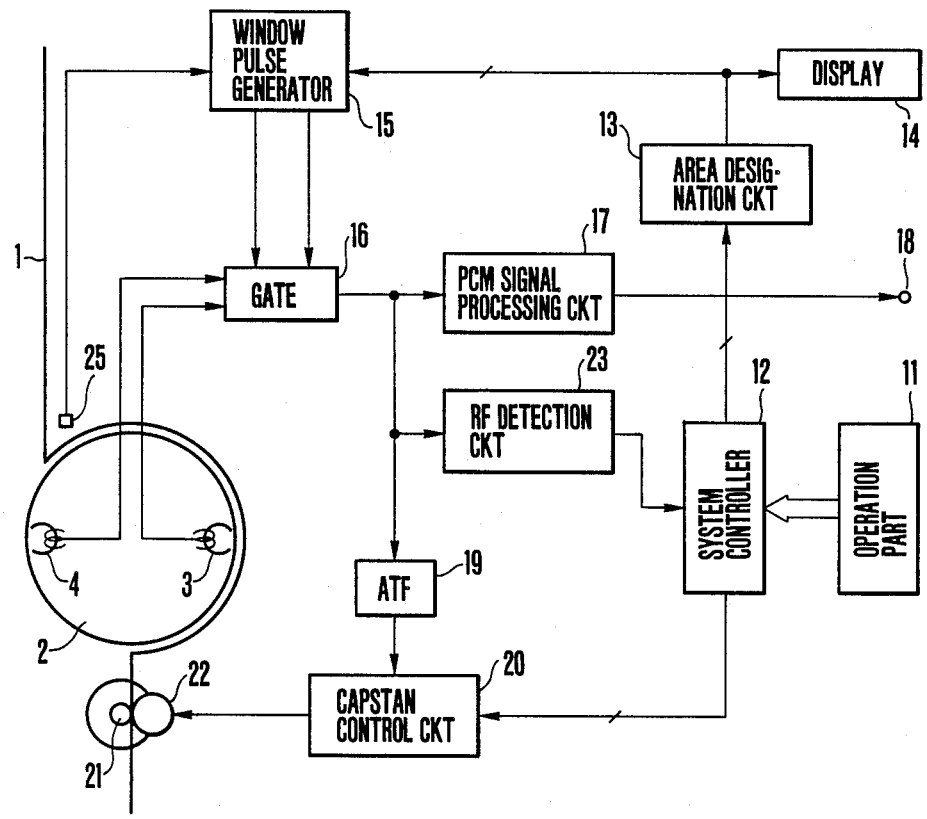
FIG. 6 is a diagram showing in outline the reproducing system of a 6-channel digital audio tape recorder arranged as an embodiment of this invention.

The following describes some of the preferred embodiments of this invention:

FIG. 6 shows in outline the arrangement of a 6-channel digital audio tape recorder which is of the above-stated kind and to which this invention is applied. In FIG. 6, the components of the recorder which are similar to the corresponding ones shown in FIG. 3 are indicated by the same reference numerals. For the sake of simplification of illustration, FIG. 6 shows only the arrangement of parts related to reproduction.

The apparatus which is arranged as shown in FIG. 6 performs an ordinary reproducing operation in the following manner: In this instance, the operator manually operates an operation part 11 to give an instruction for reproduction of information. At the same time, the operator designates at the operation part 11 one of the areas CH1 to CH6 for reproducing the information. Data of three bits indicative of the designated area is supplied from the operation part 11 to an area designating circuit 13 via system controller 12. As a result, data of six bits is produced in parallel from the area designating circuit 13. The six bit data is supplied to a display device 14 and a window pulse generator 15. Upon receipt of the six-bit data, the display device 14 has one of, for example, six display elements light up to show the designated area. Meanwhile, the window pulse generator 15 produces window pulses for gating the output of the heads 3 and 4 at the designated area tracing timing of the rotary heads 3 and 4. The window pulses are formed by a circuit which is arranged as will be described later according to a rotation phase detection signal of 30 Hz (hereinafter referred to as 30PG signal) which is produced from a head rotation detector 25.

The output of a gate circuit 16 which is under the control of the above-stated window pulses is supplied to a PCM signal processing circuit 17 which is arranged to perform a known signal processing operation including digital demodulation, time base expansion, error correction, etc. The output of the circuit 17 is then produced from a terminal 18 as a reproduced audio signal. Meanwhile, the output of the gate circuit 16 is also supplied to a tracking control circuit (hereinafter referred to as ATF circuit) 19. The ATF circuit 19 performs a processing operation in accordance with the known four frequency method by using the tracking control pilot signals included in the output of the gate circuit 16. Through this operation, a tracking control signal (ATF signal) is obtained by sampling and holding a tracking error signal obtained from the pilot signals reproduced from the designated area.

The ATF signal obtained by the ATF circuit 19 is supplied to a capstan control circuit 20. The rotation of a capstan 21 is controlled by the ATF signal. The heads 3 and 4 are thus controlled to correctly trace the recording tracks within the designated area. Then, the system controller 12 supplies the capstan control circuit 20 with data indicative of a tape travel speed for ordinary reproduction. The extent to which the tape speed is to be controlled is thus defined according to the data. A pinch roller 22 cooperates with the capstan in causing the tape 1 to travel.

Figure 7:
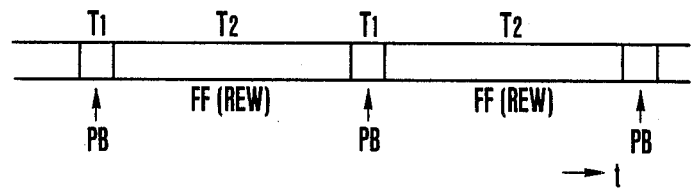
FIG. 7 is a timing chart showing an information look-up operation of the tape recorder of FIG. 6.

Referring now to FIGS. 7, 8(a) and 8(b), the fundamental concept of the information look-up operation of the above-stated tape recorder according to this invention is as follows:

FIG. 7 shows timing at which tape travel is controlled during the information look-up operation. First, to perform an ordinary reproduction (PB), the tape is allowed to travel at the same speed as the recording speed for a period of time T1. Then, the tape is allowed to travel at a high speed such as a fast feeding speed (FF) or a rewinding speed (REW) or the like for a period of time T2. FIGS. 8(A) and 8(B) respectively schematically show parts from which records on the magnetic tape is to be reproduced during the information look-up operation. As shown in FIG. 7, the tape is allowed to travel alternately at the ordinary speed for the period of time T1 and at the high speed for the period of time T2 in a repeating manner. In the case of FIG. 8(A), during the period of time T1, the records of the areas CH1 to CH6 are reproduced one after another, each for a period of T1/6. Therefore, assuming that the reproducing time for each of these areas or channels is five seconds, the time T1 is about 30 seconds. Further, assuming that the high tape travel speed of the period of time T2 is 10 times as high as the ordinary tape travel speed and that the length of one program of the information is three minutes or thereabout, the time T2 becomes (180/10=) 18 seconds or thereabout. Meanwhile, in the case of FIG. 8(B), the record of only one area is reproduced during the period of time T1. After that the tape is allowed to travel at the high speed before the record of another area is reproduced. This process is repeated. In this case, the time T1 becomes five sec and the time T2 about (18/6=) three seconds. Again referring to FIGS. 8(A) and 8(B), reference symbols CH1 to CH6 denote the areas (or channels) longitudinally extending along the tape 1 while hatching indicates the parts from which records are to be reproduced.

Figure 10:
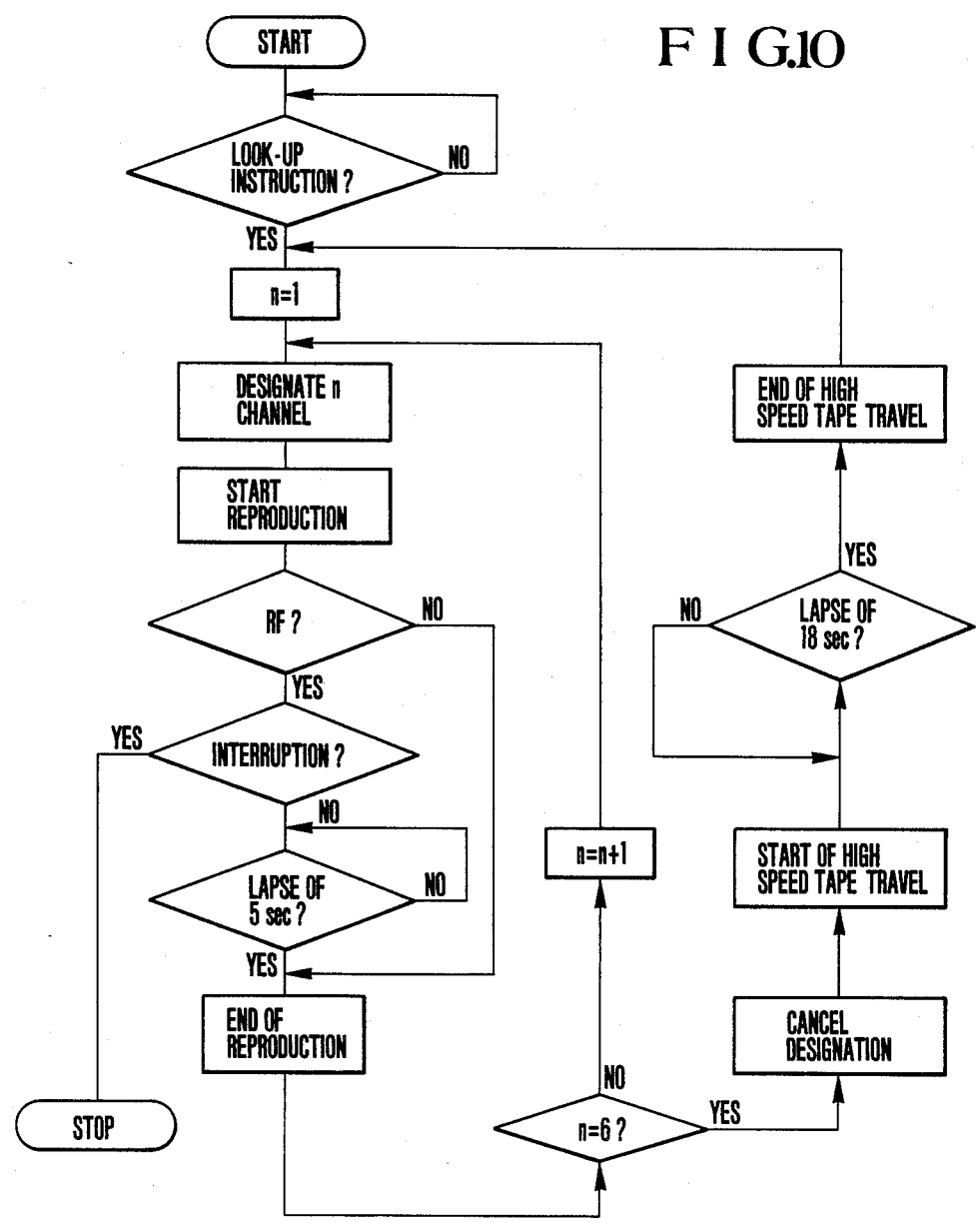
FIG. 10 is a flow chart showing the information look-up operation of a system controller included in the tape recorder of FIG. 6.

In case that the information look-up operation is to be performed in the manner as shown in FIG. 8(A), the tape recorder of FIG. 6 operates as described below with reference to FIGS. 9 and 10:

FIG. 10 is a flow chart showing the operation of the system controller 12 of FIG. 6 to be performed in the event of the information look-up operation. Referring to the flow chart, when an instruction is given for an information look-up operation at the operation part 11, the system controller sets area designating data n at "1" and, for the time being, designates the area CH1. The controller instructs the capstan control circuit 20 to have the tape travel at an ordinary speed. The reproduction of the record of the area CH1 then begins. Immediately after this, the output of the RF detection circuit 23 is checked to see if any audio signal is recorded in the designated area.

If an audio signal is recorded there, reproduction is performed for five seconds. If no audio signal is recorded there, reproduction is immediately brought to a stop. Then, the data n is incremented by one. After that, the same process is performed for the next area CH2. A phase relation which then obtains between the 30PG signal and the window pulses is as shown in FIG. 9. Referring to FIG. 9, the window pulses A and B are provided for gating the outputs of the heads 3 and 4 respectively.

When this five second reproducing process for all the areas up to the area CH6 comes to an end, the data n becomes 6. The area designation by the area designating circuit 13 is then cancelled. The gate circuit 16 is closed. At the same time, the capstan control circuit 20 is controlled to have the tape begin to travel at a high speed. The high speed tape travel is brought to an end after the lapse of 18 sec. The data n is again set at 1. The reproducing process described above then again begins with the area CH1. During this information look-up operation, if the operation part 11 is operated, the information look-up operation comes to an end with the operation on the operation part 11 acting as an interruption key. For example, if a desired sound or voice is reproduced during the process of the information look-up operation, the reproducing operation either can be brought to an end by manually operating a stop button provided at the operation part or can be allowed to continue by operating a reproduction button. With the operation part thus operated, the information look-up operation comes to an end. The system controller 12 then resumes a normal state.

With the embodiment arranged in the above-stated manner, the information look-up for all the channels or areas CH1 to CH6 is attained by allowing the tape to travel from one end to the other just for once. Therefore, a search for information can be promptly carried out. Besides, the invented arrangement does not require any additional hardware arrangement. Further, the embodiment excels in operability, because: Information about the area presently under the look-up reproducing operation is constantly on display despite of rapid changes from one area over to another and this permits a constant visual observation. Further, the above description of the embodiment is on the assumption that all the areas have information recorded in one and the same direction. However, the embodiment is applicable also to different cases where, for example: Recording and reproduction are to be performed in the forward direction on the channels CH1, CH3 and CH5 and in the reverse direction on the channels CH2, CH4 and CH6. Further, the forward direction reproduction on the channels CH1, CH3 and CH5, the reverse direction reproduction on the channels CH2, CH4 and CH6 and fast feeding or rewinding also can be repetitively performed. Further, the above-stated process of course can be carried out with any of the areas (or channels) designated as desired by the operator.

Figure 11:
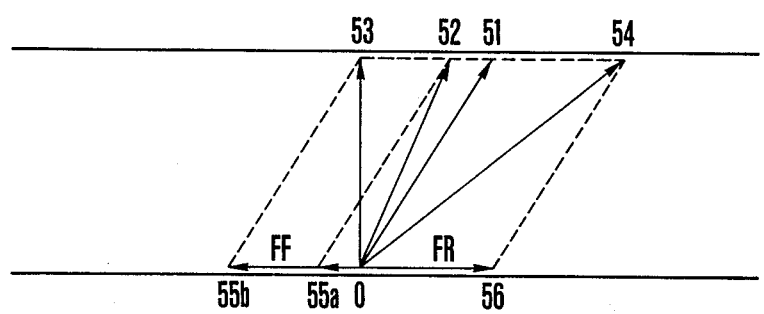
FIG. 11 is an illustration of the tracing loci of rotary heads in relation to the travelling speed of a tape.

FIG. 11 shows the scanning operation of the rotary head (hereinafter referred to as head scanning) on a magnetic tape in a rotary head type recording and/or reproducing apparatus. In FIG. 11, arrows represent velocity vectors including the rotation velocity vector 51 of the head; the travel velocity vector 55a obtained during normal recording or reproduction; a composite vector which is 52 obtained from the vectors 51 and 55a and represents the moving speed of the head scanning relative to the tape; a tape travel velocity vector 55b obtained when the tape travels at a high speed; a composite vector 53 of the head scanning obtained when the tape travels at the high speed; a tape travel velocity vector 56 obtained when the tape travels backward at a high speed; and a composite vector 54 of the head scanning direction obtained at the high backward travelling speed of the tape. Under the normal or ordinary tape travel condition, the head scanning becomes as represented by the composite vector 52. However, when the tape is allowed to travel at a higher speed in performing a high speed search (FF) by reproducing signals at the high tape speed, the velocity vector of the tape travelling direction becomes as represented by the vector 55b. Therefore, in that event, the head scanning becomes as represented by the composite vector 53. As apparent from the illustration of FIG. 11, the composite vectors 52 and 53 differ from each other in length. In other words, assuming that the rotating speed of the rotary head is unvarying, the absolute values of the relative speeds of the head and the tape differ from each other. Generally, in a recording and/or reproducing apparatus, the relative speed between the head and the tape for reproduction must be arranged to coincide with a relative speed used for recording. To meet this requirement, it has been practiced to lower the rotating speed of the rotary head for fast feeding (FF). The same also applies to a high speed reverse rotating search (FR).

In the event of a tape travel speed 30 times as high as the ordinary tape travel speed, the rotating speed of the head must be adjusted within a range of about +10%. In that event, the signal of 30 Hz which is obtained in synchronism with the rotation of the head by detecting the predetermined rotation phase of the head (hereinafter referred to as the 30 PG signal) comes to vary its frequency accordingly. Then, in case that a plurality of rotation phase detection signal of different phase (hereinafter referred to as MPG signals) are to be obtained, the time deviation between the MPG signals must be likewise adjusted ±10%. Meanwhile, it has bee practiced to obtain the MPG signals by counting reference clock pulses by means of a CPU.

The conventional method of counting the reference clock pulses by means of a CPU in obtaining the MPG signals necessitates rewriting of data relative to the time difference of the MPG signals from the 30PG signal every time according to the search speed. This results in an increase in the amount of the programs of the CPU. In addition to that problem, the amount of variations in the tape speed which results from adjustment of the rotating mechanism cannot be absorbed. Particularly, in the case of a variable speed search, it is hardly possible to accurately prepare the MPG signals in accordance with the conventional method described.

Figure 13:
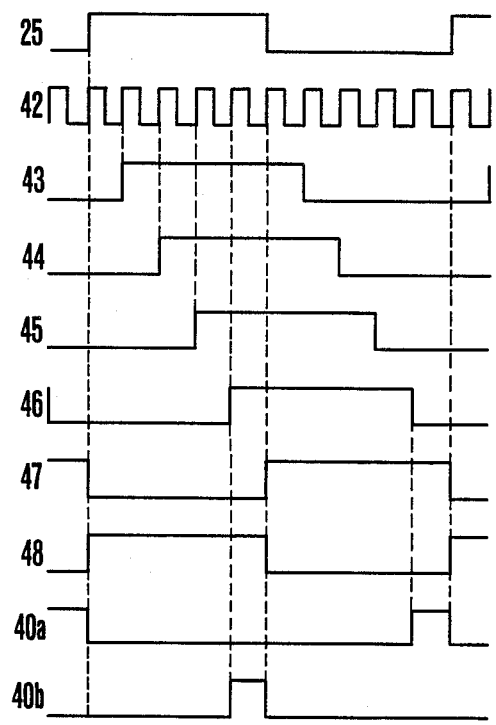
FIG. 13 is a timing chart showing the wave forms of signals reproduced from the various parts of FIG. 12.
Figure 12:
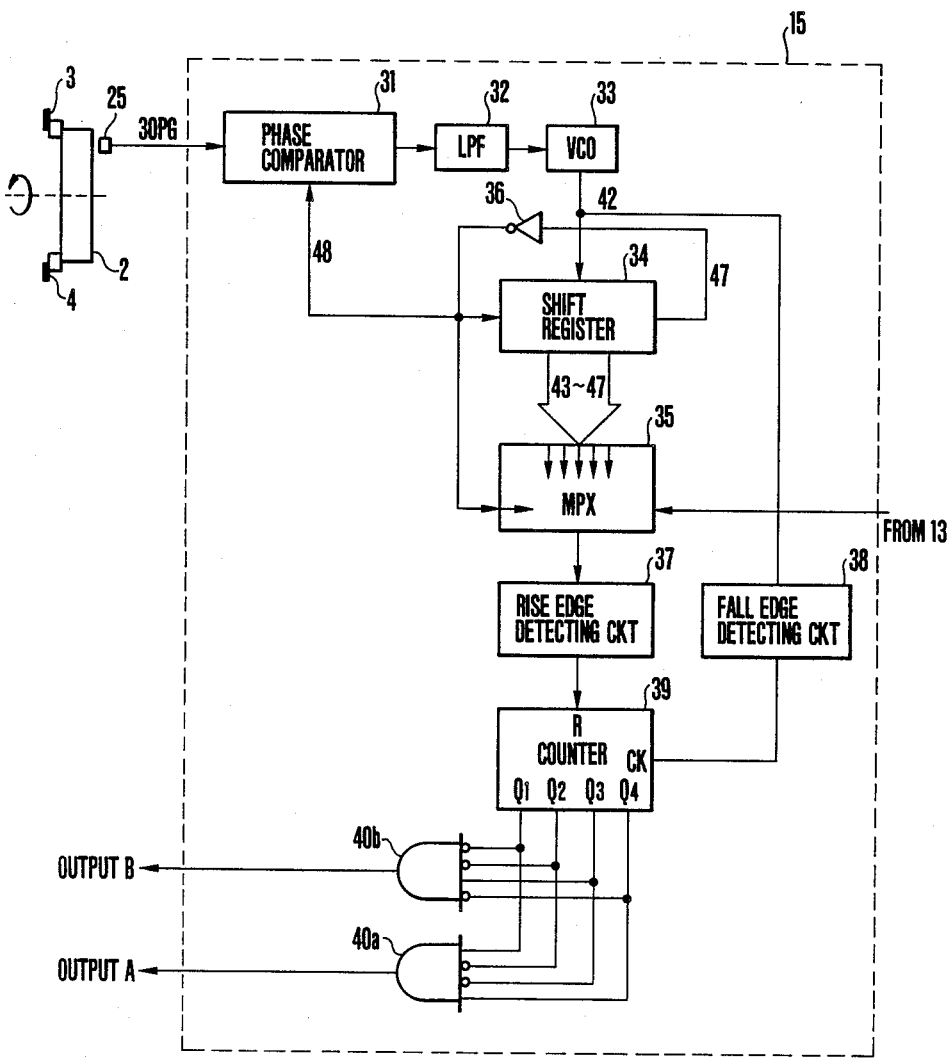
FIG. 12 is a diagram showing by way of example the details of a window pulse generating circuit included in the tape recorder of FIG. 6.

To solve these problems, this embodiment is provided with the window pulse generator 15 as shown in FIG. 6. The details of the window pulse generator 15 are as shown in FIG. 12. FIG. 13 is a timing chart showing the wave forms of the outputs of various parts included in FIG. 12. Referring to FIG. 12, the illustration includes a phase comparator 33; a low-pass filter (LPF) 32; a voltage controlled oscillator (VCO) 33; a shift register 34; a multiplexer (MPX) 35; and inverters 36 and 40. A rotation detector 25 is arranged to generate the 30 PG signal by detecting a predetermined rotation phase of the rotary drum (or cylinder) 2 on which the rotary heads 3 and 4 of FIG. 6 are mounted. A clock signal 42 which has a frequency five times as high as that of the 30PG signal is arranged to be supplied to the shift register 34. Rotation phase detection signals 43, 44, 45, 46 and 47 are generated in synchronism with the clock signal 42 and have their phases differ by 1/10 period from each other. A signal 48 is obtained by inverting the rotation phase detection signal 47 through the inverter 36 and is supplied to the phase comparator 31. FIG. 13 shows this output signal 48 on the assumption that the signal 48 is not deviating from the 30PG signal 41.

The 30PG signal 41 which serves as a reference is arranged to be always compared with the signal 48 produced from the inverter 36. In the event of any phase difference between these signals 41 and 48, the input of the VCO 33 changes. Then, the frequency of the clock signal 42 coming to the shift register 34 also changes to suppress the phase difference.

Therefore, the shift register 34 produces the outputs 43 to 47 in five steps. Together with these outputs, the output of the inverter 36 is supplied to the MPX 35. Then, in accordance with data produced from the area designation circuit 13, the MPX selects one of these inputs and produces it as a rotation phase detection signal. The six signals 43 to 48 are as shown in FIG. 13. The MPX 35 selects the signal 48 when the area CH1 is designated by the area designation circuit 13 and one of other signals 43, 44, 45, 46 and 47 as applicable when one of other areas CH2, CH3, CH4, CH5 and CH6 is designated by the circuit 13.

A counter 39 is arranged to be reset by the rise edge of the MPG signal detected by a rise edge detector 37. The counter 39 is a four-bit counter and counts the rise edges of clock pulses which are produced from the VCO 33 and are detected by a rise edge detector 38. The output level of an AND gate 40a becomes high when the output of the counter 39 is 9. The output level of another AND gate 40b becomes high when the output of the counter 39 is 4. When the area designated is the area CH1, the signal 48 shown in FIG. 13 is produced from the MPX 35. Then, the outputs of the AND gates 40a and 40b become as shown at parts 40a and 40b in FIG. 13. These output signals of the AND gates 40a and 40b are at high levels only when the heads 3 and 4 are tracing the area CH1. The gate circuit 16 is controlled by these signals.

With the window pulse generator 15 arranged as shown in FIG. 12, the embodiment is capable of thus absorbing the variations of the phase difference relative to the frequency variations of the 30 PG signal by means of a PLL circuit. Therefore, the plurality of rotation phase detection signals having the predetermined phase difference from each other can be obtained along with a gate pulse signal.

Figure 15:
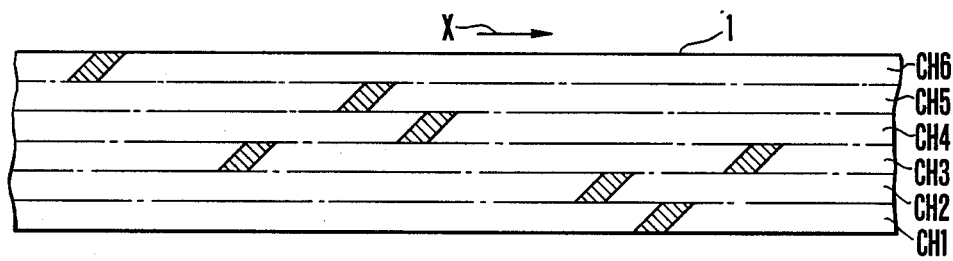
FIG. 15 is an illustration of parts of a tape from which records are reproduced during an information look-up operation of the tape recorder of FIG. 14.

Another embodiment of this invention is arranged as described below with reference to the accompanying drawings, in which: FIG. 14 shows in outline the arrangement of a 6-channel digital audio tape recorder as this embodiment; and FIG. 15 schematically shows a function of the embodiment. In FIG. 15, program change-over points are indicated by hatched parts of areas CH1 to CH6. Assuming that an audio signal is recorded in the direction of arrow, the embodiment is arranged to be capable of reproducing the audio signal only from the hatched parts one after another in the longitudinal direction irrespective of the recording areas.

Figure 4:
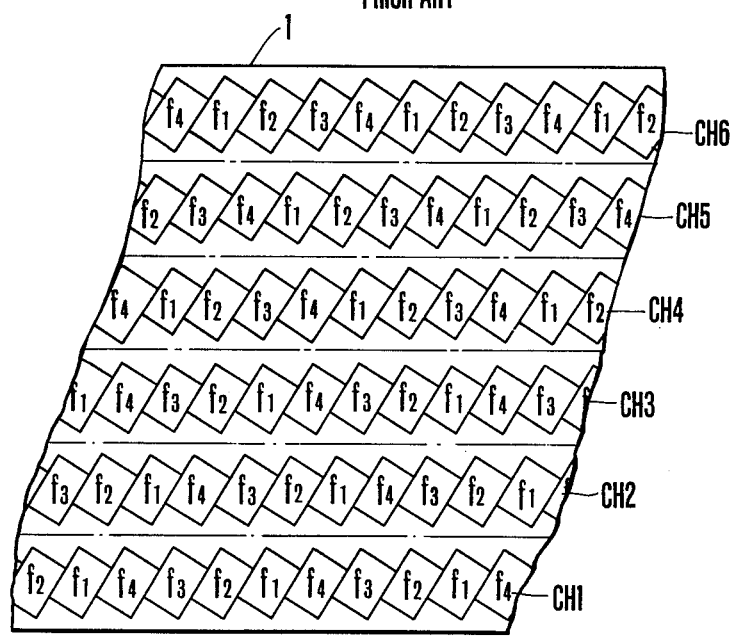
FIG. 4 is an illustration of recording tracks formed on a tape by the tape recorder of FIG. 3.
Figure 16:
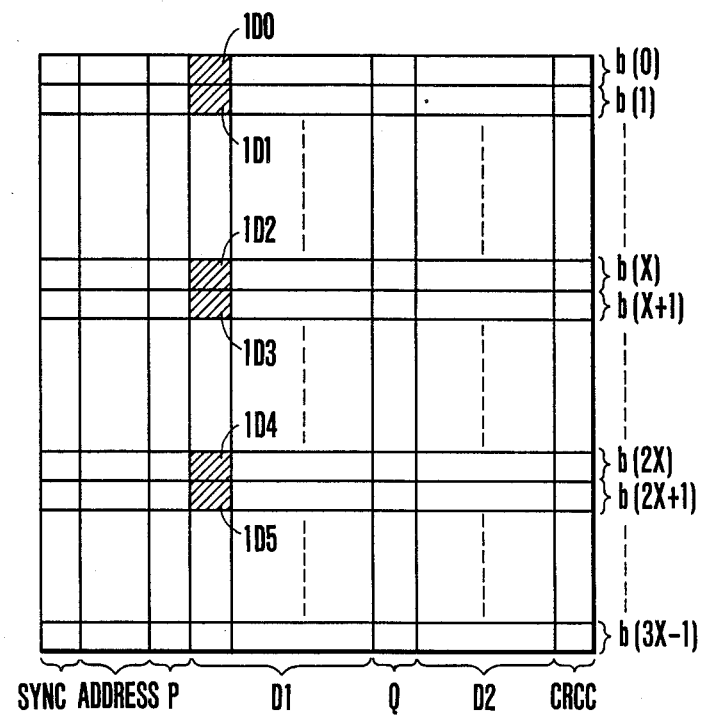
FIG. 16 is an illustration of a data format in which data is recorded and reproduced by the tape recorder of FIG. 14.

For this mode of reproduction, a program number is recorded along with the audio signal in each of the tracks of every one of the areas. Then, the program number is reproduced by the rotary head while the tape is allowed to travel at a high speed in the direction of arrow X. When the program number comes to change to another number for some of the areas, the tape travel speed is reduced down to a normal reproduction speed and then the audio signal is reproduced from that area for a predetermined period of time. After the lapse of the predetermined period of reproduction, the tape is again allowed to travel at the high speed and the program number is reproduced from all the areas. After that, this process is repeated. By this, the hatched parts of FIG. 15 alone can be reproduced at a high speed. To perform this function as mentioned above, the embodiment is arranged as follows: FIG. 16 shows by way of example a data format for data recordable in each of the recording tracks in each of the areas shown in FIG. 4. In other words, this is an example of format of data including the PCM audio data corresponding to a 1/60 sec portion of 2-channel audio signal. A data matrix shown in FIG. 16, includes a synchronizing data column SYNC; an address data column ADDRESS; columns P and Q of redundant data for error correction; a column CRCC of known CRCC check code data; and data columns D1 and D2 each of which consists of a plurality of columns including audio signal information of two channels. The data matrix further includes lines b(0) to b(3x-1). Each of these lines forms one data block and is arranged to have data recorded one by one from the left end to the right end of the line. For example, after the data of the column SYNC on the line b(0), the data of the column ADDRESS on the line b(0) is recorded. The data of the column P on the line b(0) is recorded after the data of the column ADDRESS and so on. Further, after the data of the last column on the line b(1), the data of the column SYNC on the line b(1+1) is recorded. The data recording for one track comes to an end when the data of the last column on the line b(3x-1) is recorded.

Six data ID0 to ID5 of the first of the columns included in the column D1 and on the lines b(0), b(1), b(x), b(x=1), b(2x) and b(2x+1) represent information other than the information carried by the audio signal. In this specific embodiment, the data ID1 represents a program address; and the data ID0 a program number.

Figure 5:
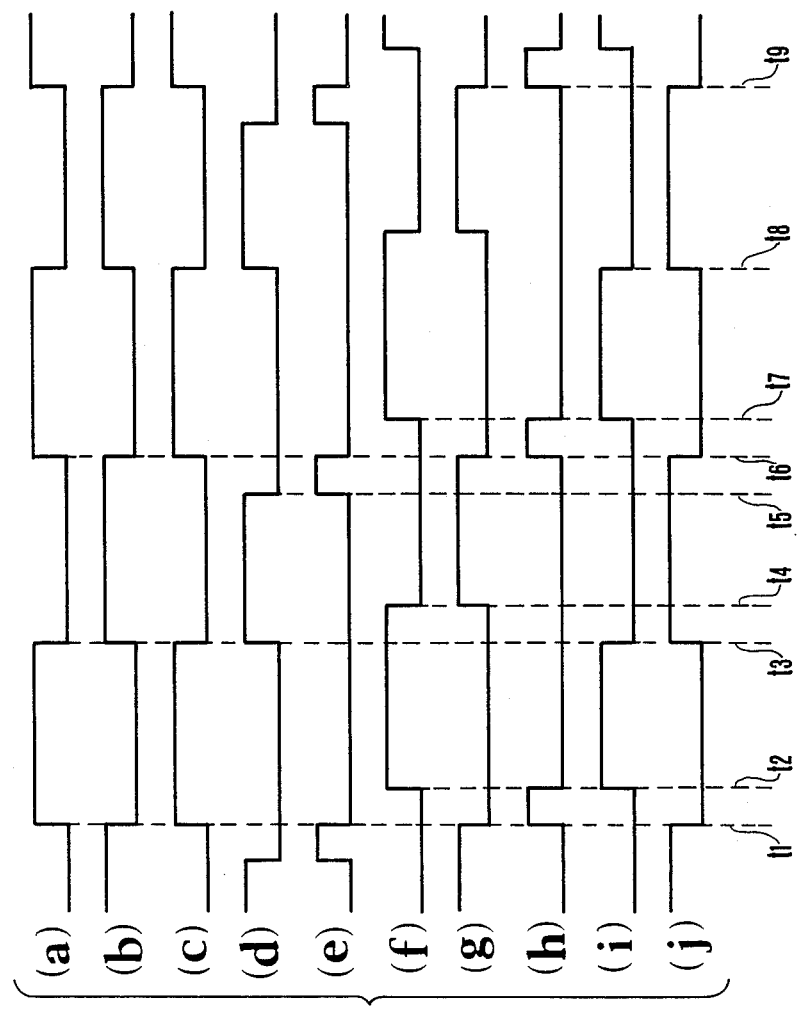
FIG. 5 is a timing chart showing the recording and reproducing operations of the tape recorder of FIG. 3.

In FIG. 14, the same component elements which are similar to the corresponding component elements of FIG. 6 are indicated by the same reference numerals. The ordinary recording and reproducing operations of the recorder shown in FIG. 14 are as follows: A recording instruction is issued and a recording area is designated at the operation part 11. In response to this, the system controller 12 instructs the capstan control circuit 13 to cause the capstan 21 to rotate at a standard speed. This in turn causes the tape 1 to travel at a standard speed. The controller 12 also instructs the area designation circuit 13 to generate area designating data corresponding to the area designated by the operation part 11. A rotation phase detector 25 is arranged to detect the rotation phase of the rotary cylinder 2 and to generate the PG signal as shown at the part (a) in FIG. 5. The PG signal is supplied to a window pulse generating circuit 15 and a timing signal generating circuit 68. The window pulse generating circuit 15 then produces the above-stated window pulse by using the area designating data and the PG signal for operating a gate circuit 16 at such a timing as to have the rotary heads 3 and 4 then come to trace the designated area. For example, when the designated area is the area CH1, a gate pulse signal G1 is produced for the head 3 as shown at the part (e) in FIG. 5 and another gate pulse signal G2 which is phase shifted 180 degrees from the gate pulse signal G1 for the other head 4. The timing signal generating circuit 68 then produces a timing pulse signal on the basis of the PG signal and the area designating data for defining a timing for the above-stated PCM audio signal processing operation and applies the timing pulse signal to a PCM audio signal processing circuit 17.

With the embodiment arranged in this manner, an incoming audio signal received at a terminal 61 is recorded in the area CH1 in the form of a PCM audio signal which has been time base compressed.

When an instruction for ordinary reproduction is issued via the operation part 11, the gate pulse generating circuit 15 and the timing signal generating circuit 68 also generate necessary pulse signals and a reproduced signal processing operation is performed in the same manner as described in the foregoing. An audio signal which is reproduced from the designated area is then produced via a terminal 18.

Figure 17:
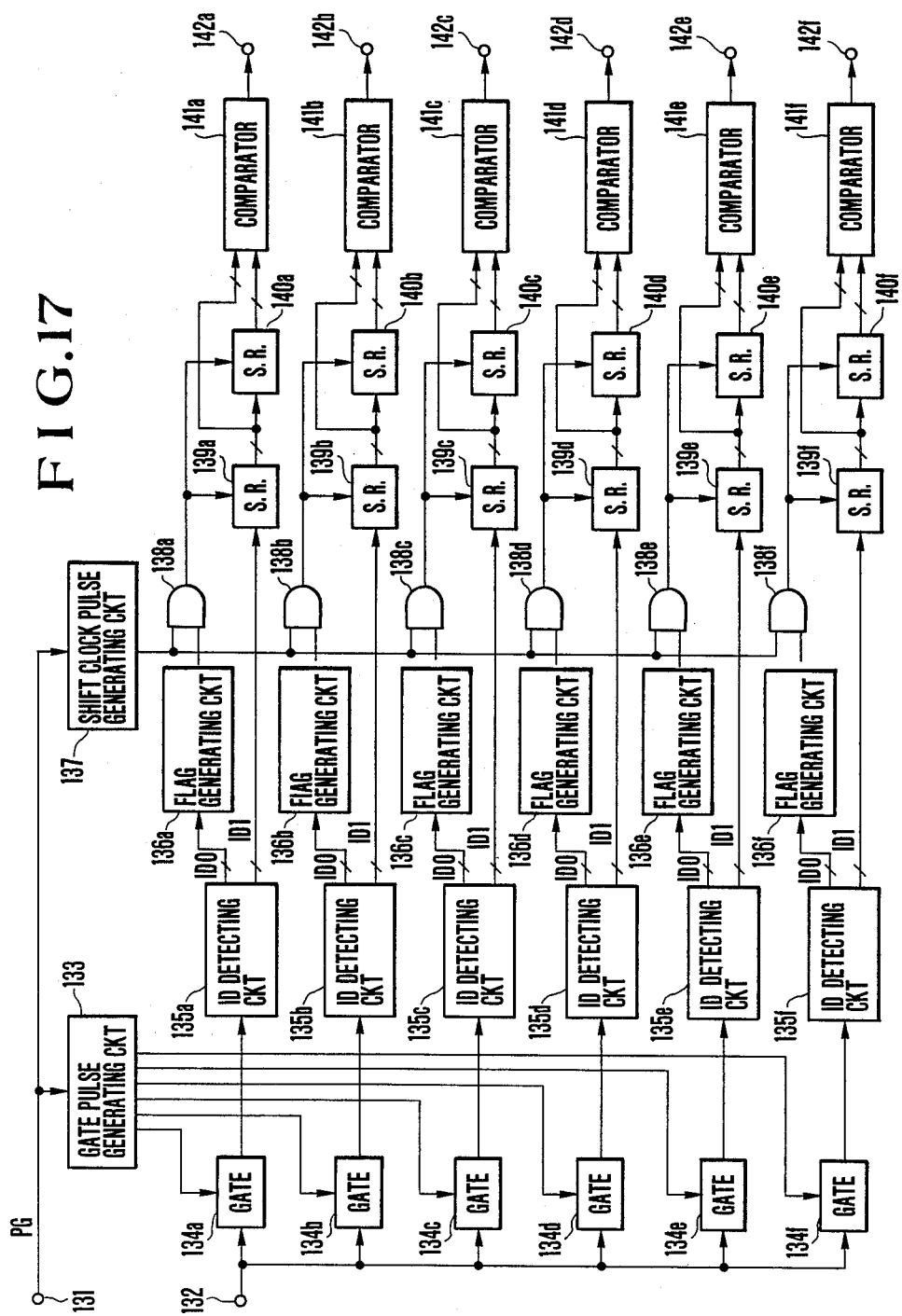
FIG. 17 is a circuit diagram showing by way of example the arrangement of a leader part detecting circuit included in the tape recorder of FIG. 14.

In performing the above-stated function (hereinafter referred to as multi-scanning), the embodiment operates as follows: A leader part detecting circuit 63 is arranged to detect the leader parts of all the programs recorded in all the areas. The details of the arrangement of the circuit 63 are as shown in FIG. 17.

Figure 1:
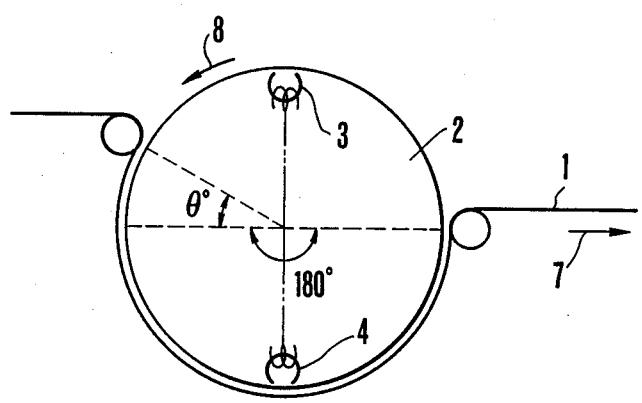
FIG. 1 is a schematic illustration of the magnetic tape transport system of the conventional VTR.
Figure 2:
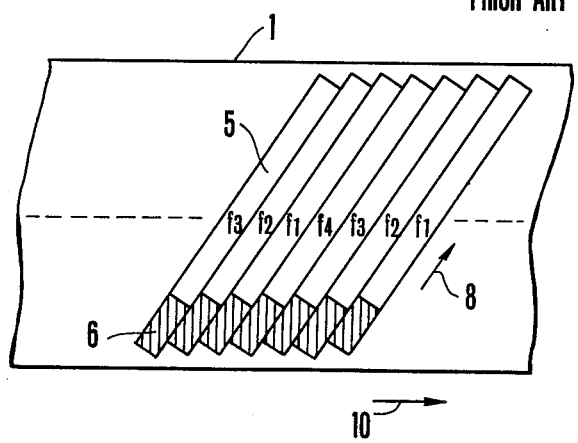
FIG. 2 is an illustration of recording tracks formed on a magnetic tape by the VTR shown in FIG. 1.

Referring to FIG. 1,, a terminal 131 is arranged to receive the PG signal. A terminal 132 is arranged to receive a signal reproduced by the head 3. A gate pulse generating circuit 133 is arranged to generate six different gate pulse signals for operating gate circuits 134a, 134b, 134c, 134d, 134e and 134f when the head 3 comes to trace each of the areas. The signal reproduced by the head 3 from the areas CH1 to CH6 are thus supplied to ID detecting circuits 135a to 135f as applicable.

Each of the ID detecting circuit 135a to 135f is arranged to detect the above-stated data ID0 by using the synchronizing data (sync). Each of the data ID0 and ID1 produced from the circuits 135a to 135f is renewed when the rotary head 3 again comes to trace each of the areas CH1 to CH6. Flag generating circuits 136a to 136f are arranged to produce their outputs at a high logical level (hereinafter referred to as "1") when the data ID0 or ID1 received represents a program number.

A shift clock pulse generating circuit 317 is arranged to generate a narrow pulse every time the rotary head 3 makes one turn, that is, only when the head 3 is, for example, at the point A as shown in FIG. 3. When the data ID1 indicates a program number, the data is gated by AND gates 138a to 138f and is allowed to drive shift registers (SR) 139a to 139f and 140a to 140f.

As apparent from this arrangement, comparators 141a to 141f are arranged to detect any change in the program number on the basis of the data ID1 reproduced from the areas CH1 to CH6 respectively. When the program number of each area changes, the comparators produce from terminals 142a to 142f detection data for the leader part of the program of each area at "1". The leader detection data of six bits thus obtained is supplied to the system controller 12.

Figure 18:
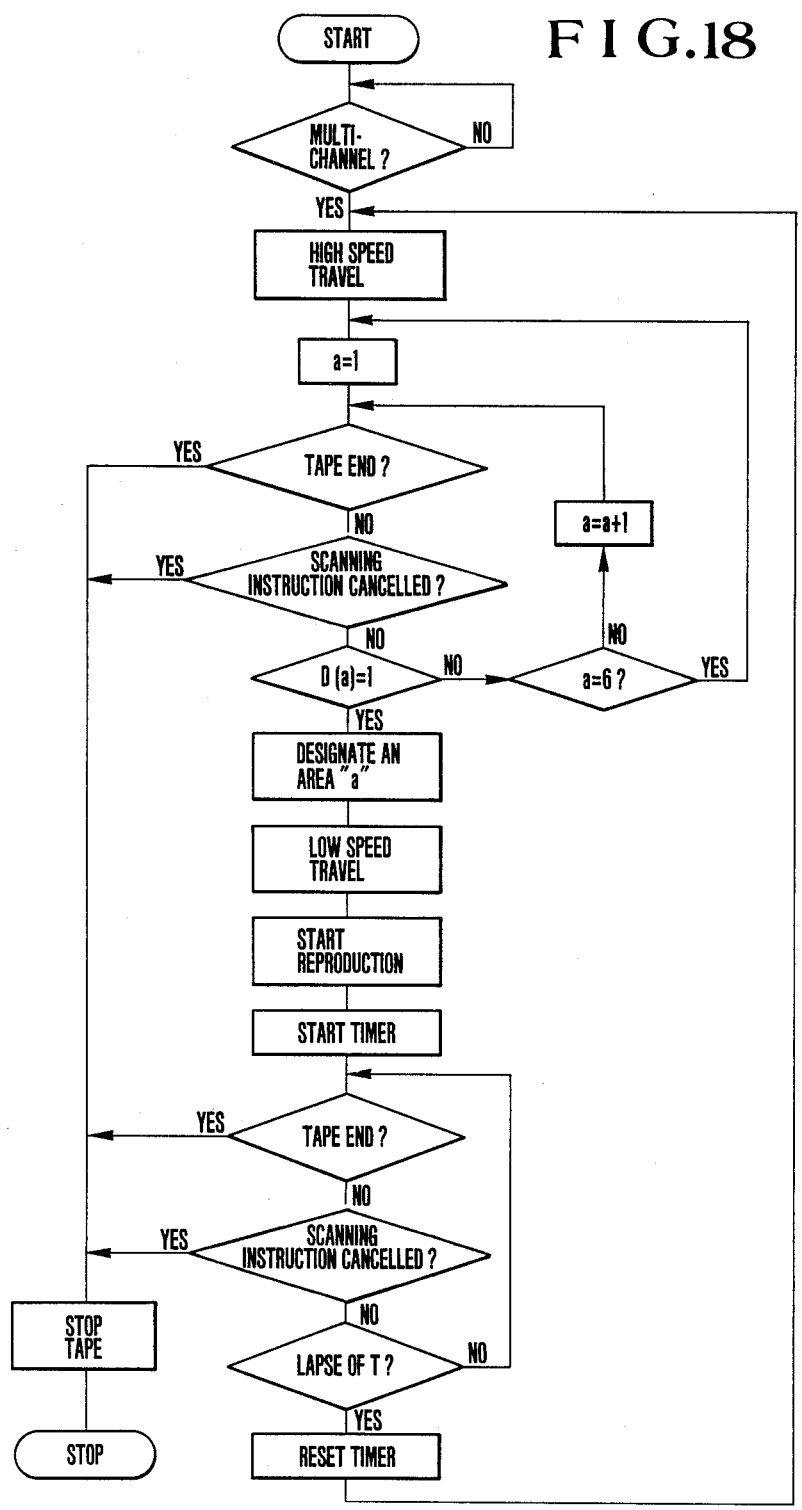
FIG. 18 is a flow chart showing the information look-up operation of a system controller included in FIG. 14.

FIG. 18 is a flow chart showing the operation of the system controller 12 to be performed for the multi-scanning. The multi-scanning operation of the controller is as follows: When an instruction for multi-scanning is issued from the operation part 11, the tape 1 is caused to travel at a high speed via the capstan control circuit 13. A variable a is set at 1. In FIG. 18, a symbol D(a) represents the detection data for the leader part of an area CHa. During the high speed travel of the tape 1, whether the multi-scanning instruction is cancelled by the operation part 11 and whether the end of the tape 1 is detected by a tape end detector 65 are under constant surveillance. In the event of detection of either the cancellation of multi-scanning or the end of the tape, the multi-scanning operation is brought to an end by bringing the tape travel to a stop.

When the leader part for the area CHa is detected, i.e. when the detection data D(a) becomes "1", the area designation circuit 15 is caused to designate the area CHa. Further, the capstan control circuit 13 is instructed to cause the tape to travel at a standard speed. Then, reproduction of an audio signal begins from the area CHa and a timer 64 begins to operate. The audio signal reproduction is performed while maintaining surveillance over the end of the tape and a multi-scanning ending operation until the lapse of a predetermined period of time (T) as counted by the timer 64. Upon termination of reproduction for the predetermined period, the timer 64 is reset and the above-stated leader part detecting action is resumed by again causing the tape to travel at a high speed.

The embodiment which is arranged as described above is capable of reproducing the leader parts of programs recorded in all the areas for a predetermined period of time for each of these programs by having the tape travel from one end to the other just for once. Therefore, an information look-up or search operation can be accomplished within a very short period of time.

In the embodiment described, the program number is recorded at the data ID1 and a change thereof is arranged to be detected. This arrangement may be changed, for example, to have a given number of bits of the data ID1 recorded as "1" just for a given period of time from the start point of each program and to detect that part of the data. As described in the foregoing, the embodiment is capable of promptly detecting any program recorded in any of the plurality of recording areas extending in parallel in the longitudinal direction of a tape-shaped recorded bearing medium.

Figure 19:
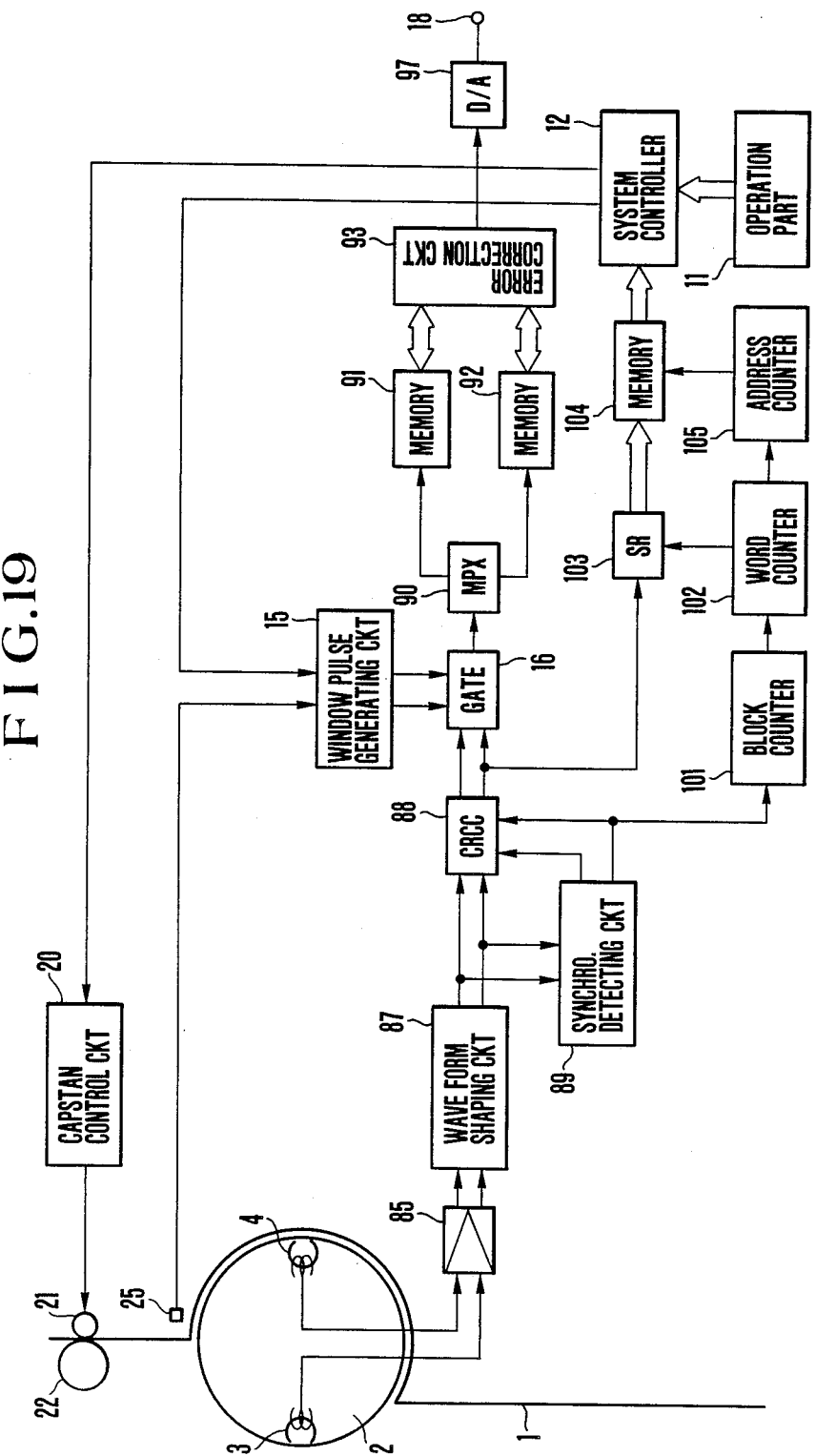
FIG. 19 is a diagram showing in outline the reproducing system of a tape recorder arranged according to this invention as a further embodiment of this invention.

FIG. 19 shows the arrangement of a reproducing system suited for a 6-channel digital audio tape recorder having such functions as those of the embodiment shown in FIG. 14. In FIG. 19, components similar to corresponding ones of FIG. 14 are indicated by the same reference numerals. The illustration includes a reproduction amplifier 85; a wave form shaping circuit 87; a CRCC circuit 88 which detects an error by means of the above-stated CRC data; a synchronization detecting circuit 89; a multiplexer (MPX) 90; memories 91 and 92; and an error correction circuit (ERC) 93. With the reproducing system arranged in this manner, a signal produced from the reproduction amplifier 85 undergoes a process such as digital demodulation or the like performed by the wave form shaping circuit 87. The wave form shaped output of the circuit 87 is supplied to the CRCC (circuit) 88 and the synchronization detecting circuit 89. At the CRCC 88, a known error check is performed by means of the CRC data in synchronism with a synchronizing signal coming from the synchronization detecting circuit 89. The MPX 90 supplies data for one track gated by the gate circuit 16 alternately to the memories 91 and 92 for storage there. The data stored at the memories 91 and 92 is supplied to the ERC 93 for error correction or the like.

Audio data among the error corrected data is supplied in a state of having been time base expanded to a digital-to-analog (D/A) converter 97. An analog signal thus obtained is produced from a terminal 18.

The illustration of FIG. 19 further includes a block counter 101 which counts the number of data blocks included in the reproduced data; a word counter 102 which counts the number of data words included in each data block; a shift register (SR) 103 arranged to serial-to-parallel convert the ID data; and an address counter 105 which is arranged to control the addresses of a memory 104.

With the output of the synchronization detecting circuit 89 supplied to the block counter 101, the counter 101 counts the number of the data blocks. Then, in cooperation with the words counter 102, the counter 101 causes the shift register 103 which is a transfer means to extract only the ID data in a real time operating manner. In other words, the ID data is extracted by the shift register 103 before the processing operations of the multiplexer 90, the memories 91 and 92 and the error correction circuit 93. Then, the extracted ID data is stored at the ID data holding memory 104 for a plurality of recording areas. The data thus stored is supplied to the system controller 12 to enable the controller to perform the system control in the same manner as described in the foregoing. In short, by virtue of the arrangement of the block counter 101 and the word counter 102, the reproduced ID data is detectable at a predetermined timing and all the ID data can be read out for all the areas of the record bearing medium while the rotary head makes one turn. Whereas, with the conventional apparatus of the same kind, it has been hardly possible to read out the ID data in a real time manner as the ID data must be also subjected to a signal processing operation such as error correction, etc. before reading it out, because: A considerably long period of time is required in performing the signal processing operation such as error correction, etc. on data for each track. Therefore, in order to read out the ID data from all of the six channels (or areas), six signal processing circuits of this kind have been necessary for the six channels.

What is claimed is:

1. An apparatus for reproducing information signals from a tape-shaped record bearing medium on which a plurality of channels of information signals are recorded, comprising:
   (a) reproducing means for reproducing an information signal of a selected channel among the plurality of channels from said tape-shaped record bearing medium;
   (b) moving means for moving said tape-shaped record bearing medium in the longitudinal direction thereof;
   (c) mode changing means for automatically changing the apparatus alternately between a first mode in which the information signal is reproduced by said reproducing means and said tape-shaped record bearing medium is moved by said moving means at a predetermined speed and a second mode in which said reproducing means does not reproduce the information signal and said moving means moves said medium at a speed faster than said predetermined speed; and
   (d) channel changing means for changing the channel from which the information signal is reproduced by said reproducing means from said selected channel to another channel in response to the changing of the mode of the apparatus by said mode changing means.

2. An apparatus according to claim 1, wherein said mode changing means is arranged to set and keep the apparatus in said first mode for a first predetermined period of time and to set and keep the apparatus in said second mode for a second predetermined period of time.

3. An apparatus according to claim 2, wherein said second predetermined period of time is longer than said first predetermined period of time.

4. An apparatus according to claim 2, wherein said channel changing means is arranged to change the channel, so that information signals of all of said plurality of channels are partially reproduced during said first predetermined period of time.

5. An apparatus according to claim 2, wherein said channel changing means is arranged to change the channel from which said information signal is reproduced every alternating cycle of the mode of the apparatus between said first and second modes.

6. An apparatus according to claim 1, wherein said tape-shaped record bearing medium has a plurality of parallel areas respectively extending in the longitudinal direction of the medium, wherein said reproducing means reproduces the information signal of the selected channel from a selected area among the plurality of areas, and wherein said reproducing means includes a rotary head which is arranged to trace said medium in an oblique direction.

7. An apparatus according to claim 6, wherein said channel changing means includes a gate circuit for gating a signal reproduced by said rotary head with a timing corresponding with the timing at which said rotary head traces the selected area.

8. An apparatus for reproducing information signals from a tape-shaped record bearing medium on which a plurality of channels of information signals are recorded, comprising:
   (a) reproducing means for reproducing an information signal from a selected channel among the plurality of channels on said tape-shaped record bearing medium; and
   (b) channel changing means for changing the selected channel from which the information signal is reproduced by said reproducing means cyclically so that information signals of all of said plurality of channels are partially reproduced during a predetermined period of time.

9. An apparatus according to claim 8, wherein said channel changing means is arranged to change the channel at fixed periods during said predetermined period of time.

10. An apparatus according to claim 9, further comprising:
    reproduction control means for controlling said reproducing means in such a manner that, in each said fixed period of time, said information signal is reproduced by said reproducing means during a first period of time and is not reproduced during a second period of time.

11. An apparatus according to claim 10, further comprising:
    moving means arranged to longitudinally move said tape-shaped record bearing medium at a first speed during said first period of time and at a second speed which is faster than said first speed during said second period of time.

12. An apparatus according to claim 8, wherein said channel changing means is arranged to change the channel so that information signals of all of said plurality of channels are partially reproduced during first periods of time within said predetermined of time and are not reproduced within second periods of time within said predetermined period of time.

13. An apparatus according to claim 12, further comprising:
    moving means arranged to longitudinally move said tape-shaped record bearing medium at a first speed during said first periods of time and at a second speed which is faster than said first speed during said second periods of time.

* * * * *

UNITED STATES PATENT AND TRADEMARK OFFICE
CERTIFICATE OF CORRECTION

PATENT NO. : 4,853,803
DATED : August 1, 1989
INVENTOR(S) : Tsutomu Fukatsu et al.

It is certified that error appears in the above-identified patent and that said Letters Patent is hereby corrected as shown below:

Col. 1, line 50 Change "head" to -- heads --

Col. 1, line 51 Change "8" to -- θ --

Col. 4, line 4  After "area" insert -- . --

Col. 6, line 67 Change "is" to -- are --

Col. 8, line 9  Delete "for"

Col. 8, line 15 Delete "of"

Col. 9, line 3  Change "+" to -- ± --

Col. 9, line 12 Change "bee" to -- been --

Col. 12, line 3  Change "1," to -- 17 --

Col. 16, line 20 After "predetermined" insert -- period --

Signed and Sealed this

Tenth Day of July, 1990

*Attest:*

HARRY F. MANBECK, JR.

*Attesting Officer*     *Commissioner of Patents and Trademarks*